（12）United States Patent
Park et al.

(10) Patent No.: US 8,704,979 B2
(45) Date of Patent: Apr. 22, 2014

(54) OPTICAL FILTER FOR REDUCING COLOR SHIFT IN A DISPLAY DEVICE AND METHOD OF MANUFACTURING THE SAME

(75) Inventors: Seong Sik Park, ChungCheongNam-Do (KR); Eun Young Cho, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 338 days.

(21) Appl. No.: 13/075,601

(22) Filed: Mar. 30, 2011

(65) Prior Publication Data

US 2011/0242463 A1 Oct. 6, 2011

(30) Foreign Application Priority Data

Mar. 31, 2010 (KR) .................. 10-2010-0029183

(51) Int. Cl.
*G02F 1/1335* (2006.01)
(52) U.S. Cl.
USPC ........................... 349/112; 349/104; 349/106
(58) Field of Classification Search
USPC .................. 349/57, 64, 95, 104, 112
See application file for complete search history.

(56) References Cited

U.S. PATENT DOCUMENTS

| | | | | |
|---|---|---|---|---|
| 6,417,831 B2 * | 7/2002 | Kashima | | 345/102 |
| 6,771,336 B2 * | 8/2004 | Tatsuta et al. | | 349/112 |
| 6,798,574 B2 * | 9/2004 | Kim | | 359/566 |
| 7,474,464 B2 * | 1/2009 | Wang et al. | | 359/599 |
| 7,594,733 B2 * | 9/2009 | Goto | | 362/97.1 |
| 8,154,692 B2 * | 4/2012 | Nishihara et al. | | 349/112 |
| 8,300,185 B2 * | 10/2012 | Nishihara et al. | | 349/112 |
| 2006/0103779 A1 * | 5/2006 | Amemiya et al. | | 349/95 |
| 2006/0227323 A1 * | 10/2006 | Goto | | 356/336 |
| 2009/0040440 A1 * | 2/2009 | Park | | 349/106 |
| 2009/0046219 A1 * | 2/2009 | Bell et al. | | 349/64 |
| 2009/0091824 A1 | 4/2009 | Yamashita et al. | | |
| 2009/0135468 A1 * | 5/2009 | Park | | 359/296 |
| 2009/0202838 A1 * | 8/2009 | Chen et al. | | 428/421 |
| 2009/0279175 A1 | 11/2009 | Laney et al. | | |
| 2010/0245736 A1 * | 9/2010 | Nishihara et al. | | 349/112 |
| 2010/0245737 A1 * | 9/2010 | Aoyama et al. | | 349/112 |
| 2010/0245738 A1 * | 9/2010 | Nishihara et al. | | 349/112 |
| 2010/0283947 A1 * | 11/2010 | Nishihara et al. | | 349/112 |
| 2011/0128483 A1 * | 6/2011 | Park et al. | | 349/112 |
| 2011/0242463 A1 * | 10/2011 | Park et al. | | 349/106 |

FOREIGN PATENT DOCUMENTS

| | | |
|---|---|---|
| CN | 101128755 | 2/2008 |
| WO | 2009052052 | 4/2009 |

* cited by examiner

*Primary Examiner* — Rhonda Peace
(74) *Attorney, Agent, or Firm* — Lerner, David, Littenberg, Krumholz & Mentlik, LLP

(57) ABSTRACT

An optical filter for reducing color shift in a display device includes a background layer made of a light-transmitting material and a light-diffusing pattern formed over the background layer to diffuse light. The light-diffusing pattern is a thin film coating applied along the cross section of the background layer in the depth direction thereof. The light-diffusing pattern is a self-assembled thin film in which the light-diffusing particles are self-assembled. A method of manufacturing the optical filter includes forming a concave-convex pattern layer made of a first light-transmitting material and having a concave-convex pattern, and forming the light-diffusing pattern along the sidewall surface of the concave section of the concave-convex pattern. After the light-diffusing pattern is formed, the concave section is filled with a second light-transmitting material, and the light-diffusing particles are removed from the upper surface of the convex section.

16 Claims, 15 Drawing Sheets

OPTICAL FILTER FOR REDUCING COLOR SHIFT IN A DISPLAY DEVICE AND METHOD OF MANUFACTURING THE SAME

CROSS REFERENCE TO RELATED APPLICATION

The present application claims priority from Korean Patent Application Number 10-2010-0029183 filed on Mar. 31, 2010, the entire contents of which application are incorporated herein for all purposes by this reference.

BACKGROUND OF THE INVENTION

1. Field of the Invention

The present invention relates to an optical filter for reducing color shift in a display device and a method of manufacturing the same, and more particularly, to an optical filter for reducing color shift in a display device and a method of manufacturing the same, in which both an excellent effect of reducing color shift and excellent transmittance of light incident from the front are realized.

2. Description of Related Art

In response to the emergence of the advanced information society, components and devices related to image display have been significantly improved and rapidly disseminated. Among them, image display devices have been widely distributed for use in TVs, Personal Computer (PC) monitors, and the like. Moreover, attempts are underway to simultaneously increase the size and reduce the thickness of such display devices.

A Liquid Crystal Display (LCD) is one type of flat panel display, and displays images using liquid crystals. The LCD is widely used throughout the industry since it has the advantages of light weight, low drive voltage, and low power consumption compared to other display devices.

FIG. 1 is a conceptual view schematically showing the basic structure and operating principle of an LCD 100.

With reference by way of example to a conventional Vertical Alignment (VA) LCD, two polarizer films 110 and 120 are arranged such that their optical axes are oriented perpendicular to each other. Liquid crystal molecules 150 having birefringence characteristics are interposed and arranged between two transparent substrates 130, which are coated with transparent electrodes 140. When an electric field is applied from a power supply unit 180, the liquid crystal molecules 150 move and are aligned perpendicular to the electric field.

Light emitted from a backlight unit is linearly polarized after passing through the first polarizer film 120. As shown in the left of FIG. 1, the liquid crystals remain perpendicular to the substrates when no power is applied. As a result, the light, which is in a linearly polarized state, is blocked by the second polarizer film 110, the optical axis of which is perpendicular to that of the first polarizer film 120.

In the meantime, as shown in the right of FIG. 1, when power is on, the electric field causes the liquid crystal to shift to a horizontal alignment parallel to the substrates, between the two orthogonal polarizer films 110 and 120. Thus, the linearly polarized light from the first polarizer film is converted into another kind of linearly polarized light, the polarization of which is rotated by 90°, circularly polarized light, or elliptically polarized light while passing through the liquid crystal molecules before it reaches the second polarizer film. The converted light is then able to pass through the second polarizer film. It is possible to gradually change the orientation of the liquid crystal from the vertical orientation to the horizontal orientation by adjusting the intensity of the electric field, thereby allowing control of the intensity of light emission.

FIG. 2 is a conceptual view showing the orientation and optical transmittance of liquid crystals depending on the viewing angle.

When liquid crystal molecules are aligned in a predetermined direction in a pixel 220, the orientation of the liquid crystal molecules varies depending on the viewing angle.

When viewed from the front left (210), the liquid crystal molecules look as if they are substantially aligned along the horizontal orientation 212, and the screen is relatively brighter. When viewed from the front along the line 230, the liquid crystal molecules are seen to be aligned along the orientation 232, which is the same as the orientation inside the pixel 220. In addition, when viewed from the front right (250), the liquid crystal molecules look as if they are substantially aligned along the vertical orientation 252, and the screen is somewhat darker.

Accordingly, the viewing angle of the LCD is greatly limited compared to other displays that intrinsically emit light, since the intensity and color of light of the LCD varies depending on changes in the viewing angle. With the aim of increasing the viewing angle, a large amount of research has been carried out.

FIG. 3 is a conceptual view showing a conventional attempt to reduce variation in the contrast ratio and color shift depending on the viewing angle.

Referring to FIG. 3, a pixel is divided into two pixel parts, that is, first and second pixel parts 320 and 340, in which the orientations of liquid crystals are symmetrical to each other. Either the liquid crystals oriented as shown in the first pixel part 320 or the liquid crystals oriented as shown in the second pixel part 340 can be seen, depending on the viewing direction of the user. The intensity of light reaching the user is the total intensity of light of the two pixel parts.

When viewed from the front left (310), liquid crystal molecules in the first pixel part 320 look as if they are aligned along the horizontal orientation 312, and liquid crystal molecules in the second pixel part 320 look as if they are aligned along the vertical orientation 314. Thus, the first pixel part 320 makes the screen look bright. Likewise, when viewed from the front right (350), the liquid crystal molecules in the first pixel part 320 look as if they are aligned along the vertical orientation 352, and the liquid crystal molecules in the second pixel part 340 look as if they are aligned along the horizontal orientation 354. Then, the second pixel part 340 can make the screen look bright. In addition, when viewed from the front, the liquid crystal molecules are seen to be aligned along the orientations 332 and 334, which are the same as the orientations inside the pixel parts 320 and 340. Accordingly, the brightness of the screen observed by the user remains the same or similar and is symmetrical about the vertical center line of the screen, even when the viewing angle changes. This, as a result, makes it possible to reduce variation in the contrast ratio and color shift depending on the viewing angle.

FIG. 4 is a conceptual view showing another conventional approach for reducing variation in the contrast ratio and color shift depending on to the viewing angle.

Referring to FIG. 4, an optical film 420 having birefringence characteristics is added. The birefringence characteristics of the optical film 420 are the same as those of liquid crystal molecules inside a pixel 440 of an LCD panel, and are symmetrical with the orientation of the liquid crystal molecules. Due to the orientation of the liquid crystal molecules inside the pixel 440 and the birefringence characteristics of the optical film, the intensity of light reaching the user is the total intensity of light from the optical film 420 and the pixel 440.

Specifically, when viewed from the front left (410), the liquid crystal molecules inside the pixel 440 look as if they are aligned along the horizontal orientation 414, and the imaginary liquid crystals produced by the optical film 420 look as if they are aligned along the vertical orientation 412. The resultant intensity of light is the total intensity of light from the optical film 420 and the pixel 440. Likewise, when viewed from the front right (450), the liquid crystal molecules inside the pixel 440 look as if they are aligned along the vertical orientation 454 and the imaginary liquid crystals produced by the optical film 420 look as if they are aligned along the horizontal orientation 452. The resultant intensity of light is the total intensity of light from the optical film 420 and the pixel 440. In addition, when viewed from the front, the liquid crystal molecules are seen to be aligned along the orientations 434 and 432, which are the same as the orientation inside the pixel 440 and the double-refracted orientation of the optical film 420, respectively.

However, even if the approaches described above are applied, there remains the problem shown in FIG. 5. That is, a color shift still occurs depending on the viewing angle, and the color changes when the viewing angle increases.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an optical filter for reducing color shift in a display device and a method of manufacturing the same, in which color shift in response to an increase in the viewing angle can be reduced and a decrease in the transmittance of light incident from the front can be minimized.

The technical features that are intended to be realized in the present invention are not limited to the technical objects described above, and other technical objects that have not been mentioned above will be more fully apparent to a person having ordinary skill in the art from the following description.

In an aspect of the present invention, the optical filter for reducing color shift in a display device includes a background layer made of a light-transmitting material and a light-diffusing pattern formed over the background layer to diffuse light. The light-diffusing pattern is a thin film coating that is applied along the cross section of the background layer in the depth direction thereof.

In an exemplary embodiment of the invention, the light-diffusing pattern may be a self-assembled thin film in which the light-diffusing particles are self-assembled.

In another aspect of the present invention, the method of manufacturing an optical filter for reducing color shift in a display device includes the steps of: forming a concave-convex pattern layer made of a first light-transmitting material, the concave-convex pattern layer having a concave-convex pattern; and forming a light-diffusing pattern as a thin film coating along the sidewall surface of the concave section of the concave-convex pattern.

In an exemplary embodiment of the invention, the method may further include, after forming a light-diffusing pattern, the steps of: filling the concave section of the concave-convex pattern with a second light-transmitting material, and removing the thin film coating of a light-diffusing particles from the upper surface of the convex section of the concave-convex pattern.

According to embodiments of the invention, the effect of color mixing due to diffusion can be increased in response to an increase in the viewing angle in order to minimize color shift when the viewing angle is increased, thereby increasing the viewing angle and improving the quality of an image produced by a display device.

In addition, it is possible to allow more light that is emitted from the front surface of a display panel to pass therethrough without loss, since the width of the light-diffusing pattern is very small compared to the pitch of the light-diffusing pattern, thereby minimizing a decrease in the transmittance of light incident from the front.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to various embodiments of the present invention, examples of which are illustrated in the accompanying drawings and described below. While the invention will be described in conjunction with exemplary embodiments, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Figure 6:
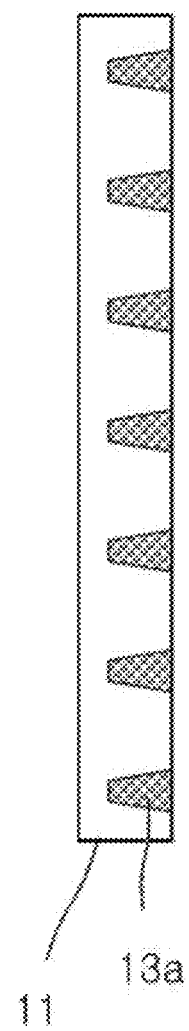
FIG. 6 is a cross-sectional view showing an optical filter according to a comparative embodiment of the invention.
Figure 7:
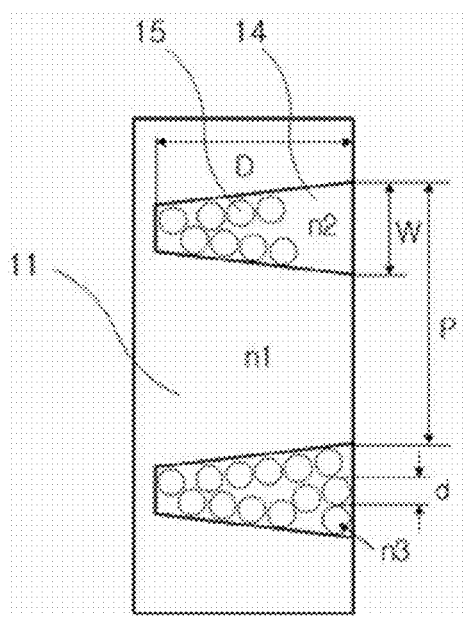
FIG. 7 is an enlarged cross-sectional view showing the optical filter shown in FIG. 6.

FIGS. 6 and 7 are a cross-sectional and an enlarged cross-sectional view showing an optical filter according to a comparative embodiment of the invention, which was previously filed by the applicant and has not be published yet.

The optical filter shown in the figures includes a background layer 11 and a light-diffusing pattern 13*a*.

The background layer 11 is a layer made of a light-transmitting material. The background layer 11 can be made of an Ultraviolet (UV) curable resin.

The light-diffusing pattern 13*a* is formed in the background layer 11 to a predetermined depth. The light-diffusing pattern 13*a* more uniformly diffuses light exiting a display panel when the viewing angle is increased. In this fashion, the light-diffusing pattern 13*a* induces color mixing, thereby reducing color shift.

The light-diffusing pattern 13*a* includes light-diffusing particles 15 such as light-diffusing beads.

For example, grooves are formed by engraving the UV-curable resin using a roll designed to form a light-diffusing pattern. Afterwards, UV rays are radiated on the UV-curable resin, thereby finally forming the background layer 11 having wedge-shaped grooves therein. Subsequently, the grooves in the background layer are filled with a mixture that is produced by mixing the light-diffusing particles 15 with a base material 14 made of a UV-curable resin, and UV rays are radiated on the resultant product, thereby finally producing the light-diffusing pattern 13*a*.

The light-diffusing pattern 13*a* has a wedge-shaped stripe pattern.

Table 1 below shows the relationship between the line width W and the pitch P of the light-diffusing pattern.

TABLE 1

| P (μm) | W (μm) | (P − W)/P | Transmittance |
|---|---|---|---|
| 74 | 15 | 79.7% | 92.3% |
| 74 | 18 | 75.7% | 87.6% |
| 74 | 25 | 66.2% | 76.7% |
| 74 | 30 | 59.5% | 68.8% |
| 74 | 35 | 52.7% | 61.0% |
| 74 | 37 | 50.0% | 57.9% |
| 74 | 40 | 45.9% | 53.2% |

Figure 1:
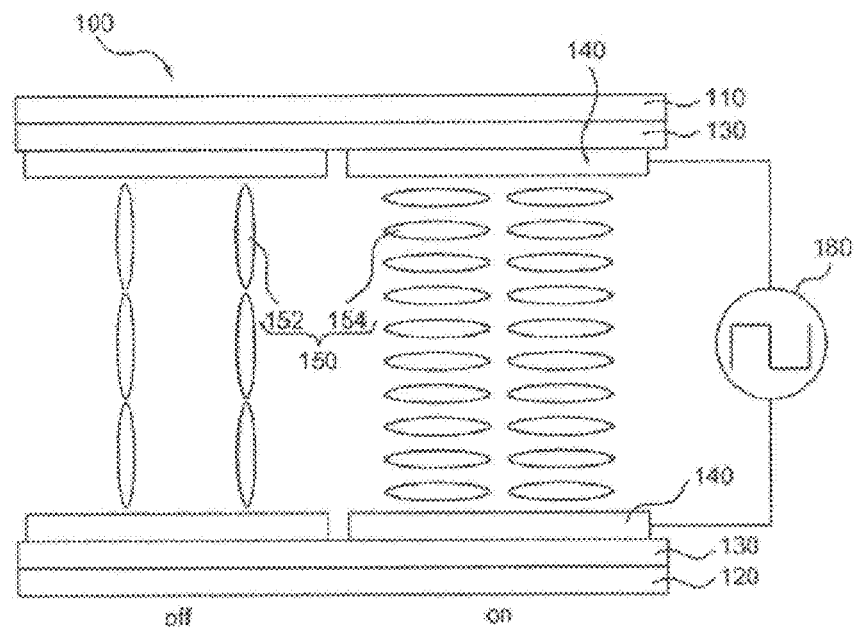
FIG. 1 is a conceptual view schematically showing the basic structure and operating principle of an LCD.
Figure 2:
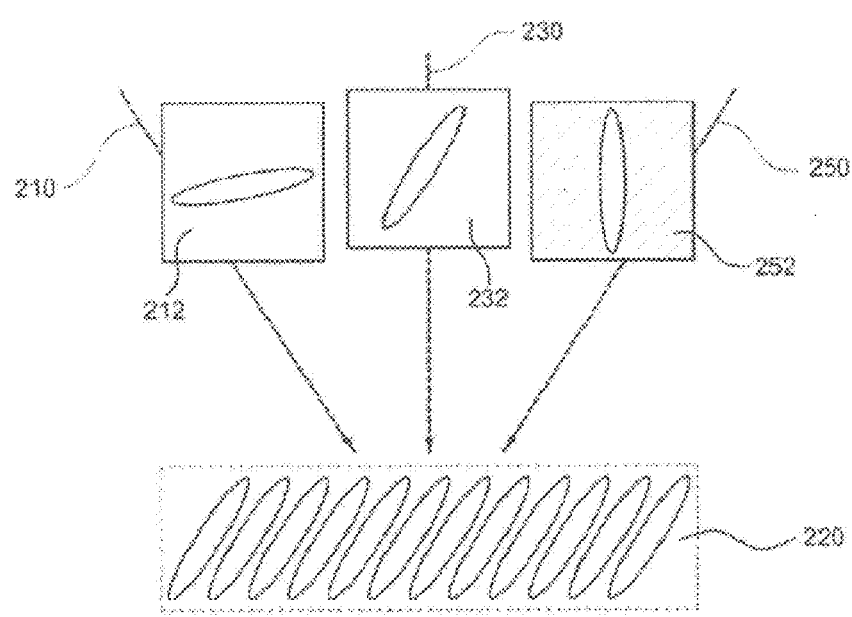
FIG. 2 is a conceptual view showing the orientation and optical transmittance of liquid crystals depending on the viewing angle.
Figure 3:
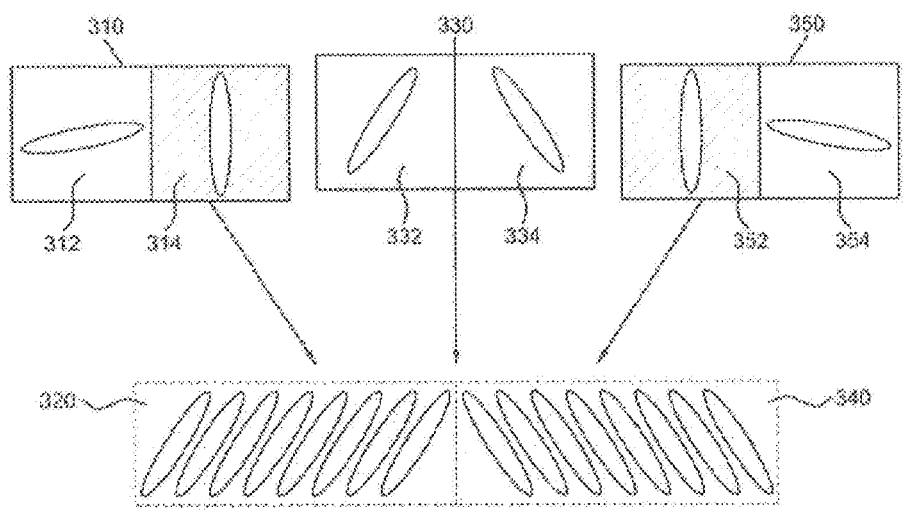
FIG. 3 is a conceptual view showing a conventional attempt to reduce variation in the contrast ratio and color shift depending on the viewing angle.
Figure 4:
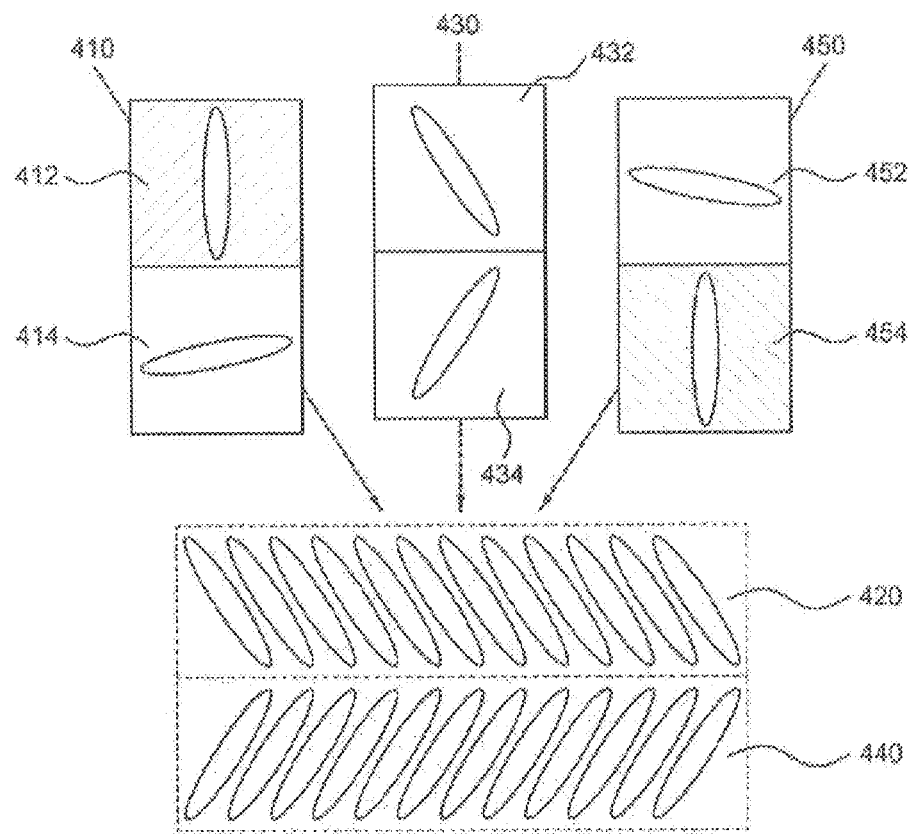
FIG. 4 is a conceptual view showing another conventional attempt to reduce variation in the contrast ratio and color shift depending on the viewing angle.

From FIG. 1, it can be appreciated that the line width W and the pitch of the light-diffusing pattern satisfy, preferably, the relationship: (P−W)/P>0.5. It is preferred that W/P be 50% or less.

Table 2 below shows the relationship between the depth D and the pitch P of the light-diffusing pattern.

TABLE 2

| P (μm) | D (μm) | D/P | Δu'v' (max) |
|---|---|---|---|
| 74 | 60 | 81.1% | 0.088 |
| 74 | 70 | 94.6% | 0.076 |
| 74 | 74 | 100.0% | 0.072 |
| 74 | 80 | 108.1% | 0.066 |
| 74 | 90 | 121.6% | 0.059 |
| 74 | 100 | 135.1% | 0.053 |

From Table 2 above, it can be appreciated that the effect of reducing the color shift is excellent when the depth D and the pitch P of the light-diffusing pattern satisfy the relationship: D/P≥1.

If both of the above-mentioned conditions, i.e. (P−W)/P>0.5 and D/P≥1, are satisfied, the condition D/2≥W is satisfied. In this case, both an excellent effect of reducing color shift and excellent transmittance of light incident from the front can be realized.

Figure 8:
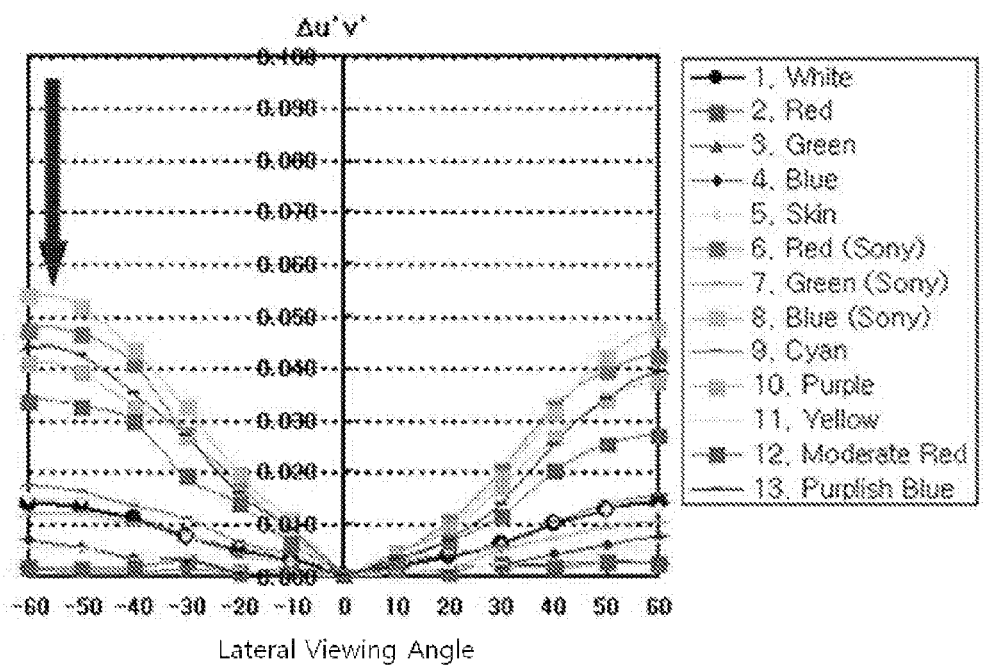
FIG. 8 is a graph showing the color shift-reducing effect of the LCD having the optical filter shown in FIG. 6.

FIG. 8 is a graph showing the color shift-reducing effect of the LCD having the optical filter shown in FIG. 6.

Figure 5:
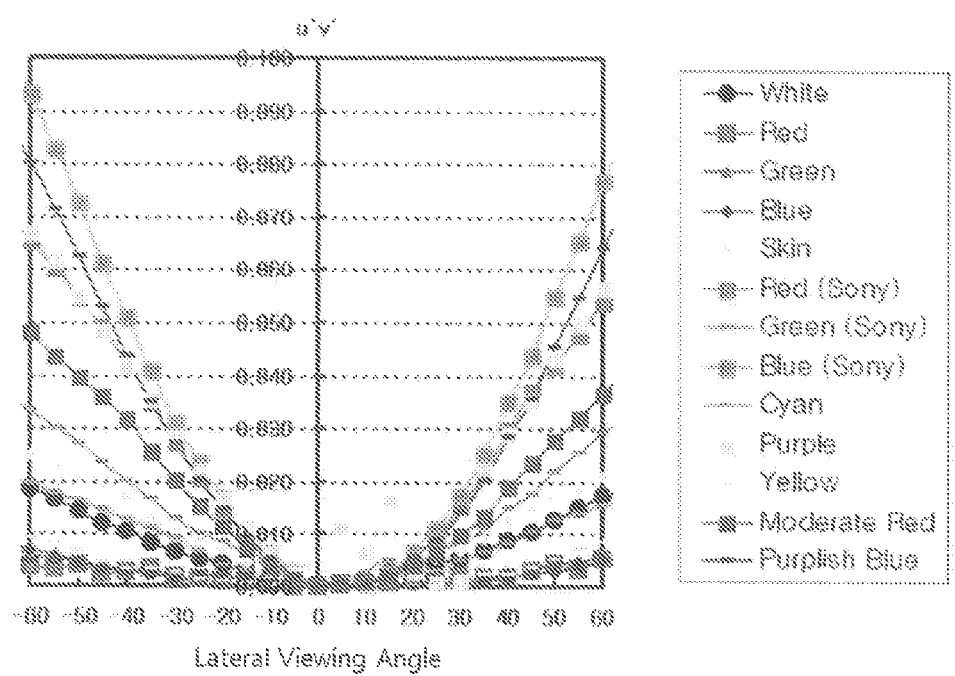
FIG. 5 is a graph showing color shifts depending on viewing angles for a bare LCD on which an optical filter is not mounted.

FIG. 8 shows the result obtained by measuring the color shift αu'v' in response to an increase in the lateral viewing angle when optical beads are added in an amount of 1% by weight to the light-diffusing pattern 13*a*, the optical beads having a refractive index of 1.59 (the difference from the refractive index of transparent resin is 0.09) and an average diameter of 6 μm. Compared to FIG. 5, it can be appreciated that the effect of reducing color shift is significant throughout all mixed colors.

Figure 9:
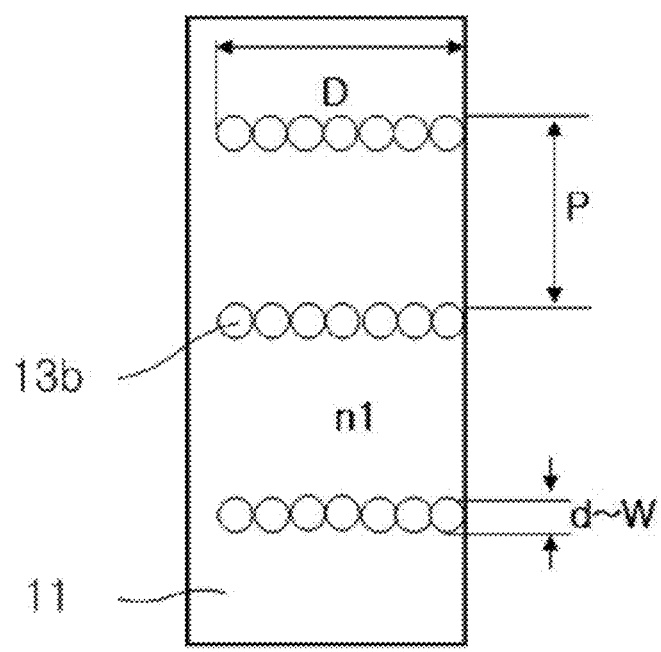
FIG. 9 is an enlarged cross-sectional view showing an optical filter according to an exemplary embodiment of the invention.

FIG. 9 is an enlarged cross-sectional view showing an optical filter according to an exemplary embodiment of the invention.

The optical filter of this embodiment is typically provided in front of a display panel.

As shown in FIG. 9, the optical filter includes a background layer 11 and a light-diffusing layer 13*b*.

The background layer 11 is a layer made of a light-transmitting material. The background layer 11 can be made of a UV-curable resin.

The light-diffusing pattern 13*b* is formed in the background layer 11 to a predetermined depth. The light-diffusing pattern 13*b* more uniformly diffuses light exiting a display panel when the viewing angle is increased. In this fashion, the light-diffusing pattern 13*b* induces color mixing, thereby reducing color shift.

The light-diffusing pattern 13*b* is applied in the form of a thin film coating along the cross section of the background layer in the depth direction thereof. Since the light-diffusing pattern is applied to the thickness of a thin film, the line width of the light-diffusing pattern can be minimized and the amount of light exiting the display panel can be maximized, thereby improving transmittance.

The light-diffusing pattern 13*b* is made of light-diffusing particles 15, such as light-diffusing beads, which are in the form of a thin film coating applied along the cross section in the depth direction of the background layer. It is preferred that the cross section of the background layer in the depth direction thereof be a cross section of the background layer that is oriented in the direction normal thereto. However, the present invention is not limited to the cross section in the normal direction, but any cross sections having a predetermined angle with respect to the normal line can be included in the scope of the invention.

It is preferred that the light-diffusing pattern be a self-assembled thin film in which the light-diffusing particles are self-assembled.

The self-assembly mechanism, in which atoms, molecules, nanoparticles, or microparticles spontaneously aggregate, thereby forming a nanostructure or microstructure, is caused by phase transition from irregularity to regularity, which spontaneously occurs due to an increase in entropy, expressed in terms of thermodynamics. If the particles are regularly arranged, entropy decreases due to a decrease in the freedom of arrangement. However, since the free space in which each particle can move is maximized, entropy consequently becomes greater. This self-assembly process closely relates to the interaction between particles (i.e. Coulomb interaction due to charges on the surface of particles, Van der Waals interaction due to polarization, hydrogen bonding, hydrophilic/hydrophobic interaction, short-range repulsive force, etc.).

At present, the self-assembly mechanism is the most practical technique for producing a nanostructure. Most molecules have a size on the order of angstroms Å (1 Å=$10^{-10}$ m). When the molecules spontaneously make a molecular assembly, i.e. a supermolecule, by joining together due to the molecular bonding, the size of the supermolecule is on the order of nanometers.

In order to produce a nanostructure, a top-down technique, in which an intended shape is produced by machining from a greater size to a smaller size using light having high energy, as in a semiconductor process, has been used to date. However, if the size is smaller, it becomes more difficult and more expensive to precisely machine an object.

In contrast, the self-assembly technique is an important technique for fabricating a nanostructure using a bottom-up approach. A self-assembled structure, such as a functional supermolecular assembly controlled at the molecular level or an arrangement of molecules or nanoparticles on the surface of a solid, is used to manufacture other nanostructures.

This self-assembly technique includes a colloidal self-assembly technique. The colloid is a system in which spherical solid or liquid particles having a size ranging from tens of nanometers to several micrometers are dispersed in a solvent that is not mixed. The most frequently used particles are high molecular particles, such as Polystyrene (PS) and Polymethylmethacrylate (PMMA), which are produced through the polymerization of units, and silica particles, which are produced through the polymerization of inorganic units.

Here, the particles are generally stabilized by an electrostatic repulsive force or high molecules adsorbed on the surface of the particles without coagulating together, and undergo irregular Brownian motion.

In particular, colloidal particles consisting of particles having very uniform size distribution are gradually converted from an irregular arrangement into a regular crystal structure in response to an increase in the concentration thereof.

The dip coating technique is currently the most popular technique for the manufacture of useful colloid crystal from a colloid solution.

Figure 10:
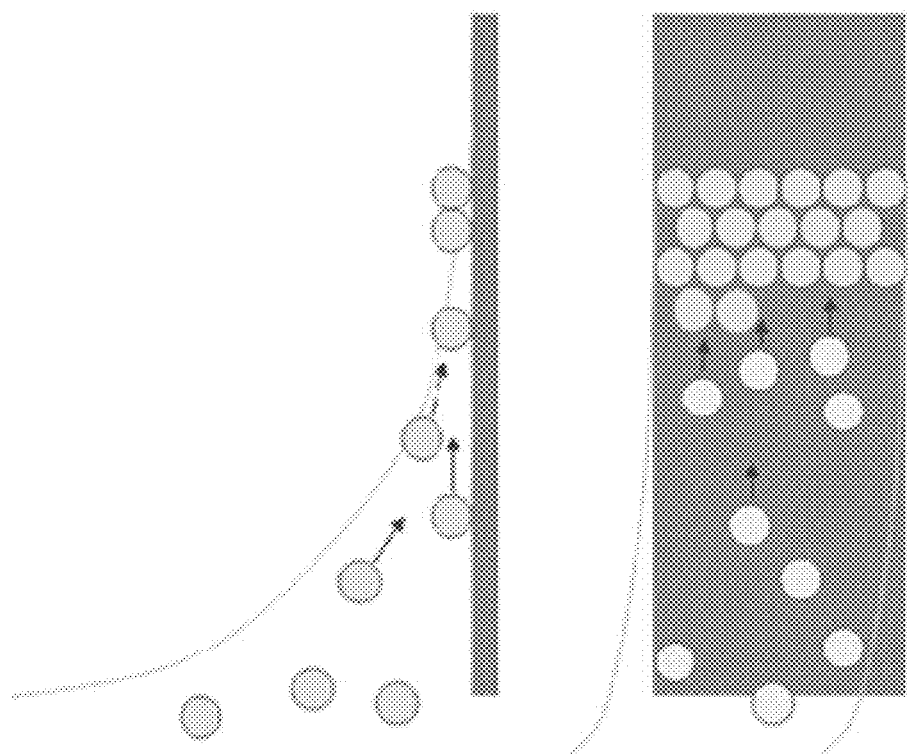
FIG. 10 is a conceptual view showing a self-assembly process.
Figure 11:
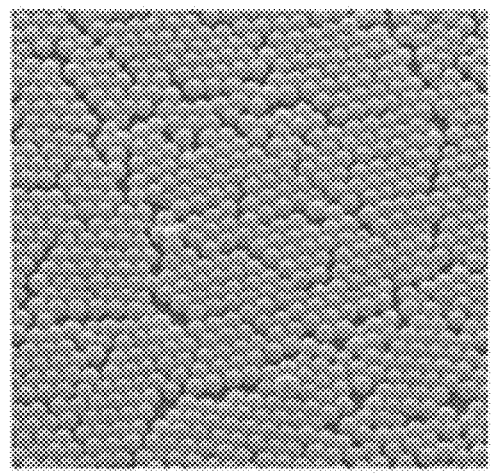
FIG. 11 is a view showing the surface on which particles are self-assembled.

The dip coating technique is a process of forming a colloidal particle coating by dipping a substrate into a colloidal solution and then gradually lifting up the substrate. In practice, when a substrate such as a glass sheet is dipped into an aqueous colloidal solution, an interface is formed between the substrate and the solution, such that particles gather at the interface due to capillary force, as shown in FIG. 10. Crystallization occurs as water, the solvent, gradually evaporates from the interface. As a result, a colloid crystal having the form of a film, as shown in FIG. 11, is generated along the substrate that is slowly lifted up. The thickness of the colloid crystal film is determined by the shape of the interface, surface tension, the speed of evaporation of the solvent, and the speed at which the dip coating is conducted.

However, it should be understood that the present invention is by no means limited to the self-assembly or dip coating of colloidal particles as described above.

The light-diffusing pattern can be implemented in any one of the patterns including, but not limited to, a stripe pattern, a wave pattern, a matrix pattern, and a honeycomb pattern, which is formed on at least one of both surfaces of the background layer. In addition, examples of the stripe pattern may include, but not limited to, a variety of patterns, such as a horizontal stripe pattern and a vertical stripe pattern. The stripe pattern formed in the horizontal direction is effective for the compensation of the vertical viewing angle, and the stripe pattern formed in the vertical direction is effective for the compensation of the horizontal viewing angle.

In order to prevent a moiré phenomenon, the light-diffusing pattern 13b can be configured such that it has a predetermined bias angle with respect to the edge of the background layer. For example, if the light-diffusing pattern is a stripe pattern, as in this embodiment, the stripes may be oriented at a predetermined angle of inclination with respect to the horizontal or vertical direction.

Although, in the embodiment shown in FIG. 9, the light-diffusing pattern 13b is illustrated as being formed by engraving the background layer 11, this is not intended to be limiting. Rather, the light-diffusing pattern can alternatively be formed as embossments.

The greater the difference in the refractive index between the light-diffusing particles and the background layer is, the more preferable it is. It is preferred that the difference in the refractive index be 0.01 or more such that light can be diffused well. In addition, it is preferred that the light-diffusing particles be spheres having an average diameter of 0.01 μm and that they be white such that they can diffuse all wavelengths of light. However, the present invention is not limited thereto.

The light-diffusing particles may be two different sizes and have two different refractive indices. It is possible to control the optical characteristics of the light-diffusing particles as desired based on the material, refractive index, size, grain size distribution, and the like thereof.

The light-diffusing particles may be made of one or more of the materials including, but not limited to, PMMA, vinyl chloride, acrylic resin, Polycarbonate (PC)-based resin, Polyethylene Terephthalate (PET)-based resin, Polypropylene (PP)-based resin, Polyimide (PI)-based resin, glass, and oxides such as silica and $TiO_2$.

The light-diffusing layer can include a backing 16 that supports the background layer 11. The backing 16 is, preferably, a transparent resin film that is UV transparent. Available examples of material for the backing 16 may include, but not limited to, PET, PC, and PVC.

The light-diffusing particles may be colored. It is preferred that the light-diffusing pattern include light-diffusing particles having a green wavelength-absorbing color, which absorbs light having a wavelength ranging from 510 nm to 560 nm. In addition, the light-diffusing pattern can also include light-diffusing particles having a cyan wavelength-absorbing color, which absorbs light having a wavelength ranging from 480 nm to 510 nm, and light-diffusing particles having an orange wavelength-absorbing color, which absorbs light having a wavelength ranging from 480 nm to 510 nm.

In the display industry, a display device is typically analyzed on the basis of 13 compound colors, namely: white, red, blue, green, skin, Sony red, Sony Blue, Sony green, cyan, purple, yellow, moderate red, and purplish blue. Mixed colors are made by combining light in green, red, and blue wavelength ranges having various grayscale levels. When light having a low grayscale level is emitted from a display panel, the luminance of the light increases over the entire wavelength range in response to an increase in the viewing angle, and particularly increases most rapidly in the green wavelength range. Therefore, it is possible to minimize color shift in the mixed color even if the viewing angle is increased by increasing the absorption of light in the green wavelength range from 510 nm to 560 nm in response to an increase in the viewing angle using the light-diffusing particles having a green wavelength-absorbing color (e.g., pink).

A Light Emitting Diode (LED) exhibits a narrow emission spectrum, concentrated at blue (about 450 nm), green (about 540 nm), and red (about 640 nm). In contrast, a Cold Cathode Fluorescent Lamp (CCFL) radiates a wide range of blue light from 420 nm to 500 nm, with three emission peaks. It also radiates a wide range of red light from 570 nm to 630 nm, with two emission peaks. Here, the peaks in the cyan wavelength range, from 480 nm to 510 nm, and the orange wavelength range, from 570 nm to 600 nm, are main factors that lead to deterioration in color reproducing ability and increased color shift.

Therefore, it is possible to use light-diffusing particles having the color that absorbs cyan wavelengths and light-diffusing particles having the color that absorbs orange wavelengths in order to absorb the orange and cyan wavelength components of light that passes through the optical filter, thereby compensating for the color shift in a display image that occurs in response to an increase in the viewing angle.

As can be understood from Tables 1 and 2 above, it is preferred that the light-diffusing pattern have a small line width and that it be deep in order to decrease the color shift and increase transmittance. From this aspect, the optical filter according to the comparative embodiment shown in FIG. 6 has limitations in that its transmittance of light incident from the front is poor.

In order to overcome this problem, the light-diffusing pattern of the present invention has been devised such that its line width is similar to the thickness of a thin film. This, consequently, makes it possible to improve the transmittance of light incident from the front while maintaining the effect of decreasing color shift.

However, there has been a problem in that the precision lathe processing, which is used in the comparative embodiment shown in FIG. 6, cannot produce a forming roll that has a line width similar to the thickness of a thin film. In addition, it is also impossible to fill the engraved grooves having such a line width with light-diffusing beads.

The present invention can overcome such limitations by forming a super-thin film through the self-assembly mechanism of the light-diffusing particles.

Below, a description is given of a method of manufacturing an optical filter.

A first step is a step of forming a layer from a first light-transmitting material 11a such that the layer forms a concave-convex pattern layer having a concave-convex pattern. It is preferred that the sidewall surfaces of the concave section of the concave-convex pattern be surfaces that are oriented in the direction normal to the concave-convex pattern layer.

It is preferred that the concave-convex pattern layer be formed via roll imprinting. Here, the width of a convex section of the forming roll is not required to be similar to the thickness of a thin film; rather, a convex section having a rectangular cross-sectional shape will be satisfactory.

Afterwards, a second step (i.e. a thin film coating step) of coating sidewall surfaces of the concave-convex pattern with a light-diffusing pattern having the form of a thin film is performed.

The second step is performed based on the principle of dip-coating, on which the colloidal self-assembly technique described above is based. Specifically, the thin film coating of the second step is performed by dipping the concave-convex pattern layer, which is output via roll imprinting, to a first depth in a colloidal solution, in which light-diffusing particles are dispersed, and allowing the concave-convex pattern layer to slowly pass through the colloidal solution, so that the light-diffusing particles form a two-dimensional colloidal crystal film on the sidewall surfaces of the concave section of the concave-convex pattern. Here, it is preferred that the first depth be smaller than the depth of the concave section of the concave-convex pattern so that the bottom of the concave section is not coated with the light-diffusing particles. It is preferred that the light-diffusing particles be self-assembled.

Afterwards, a step of filling the concave section of the concave-convex pattern with a second light-transmitting material 11b is performed. The first and second light-transmitting material 11a and 11b can be the same material or different materials that have the same refractive index. The first and second light-transmitting materials 11a and 11b can be UV-curable resins.

Afterwards, a step of removing the coating of the light-diffusing particles from the upper surface of the concave section of the concave-convex pattern by scraping it using a blade is performed.

The present invention can significantly increase productivity, preferably when an optical filter is manufactured using the roll-to-roll process described above.

Below, a description will be given of a fabrication method according to an exemplary embodiment of the invention with reference to FIGS. 12 to 15.

Figure 12:
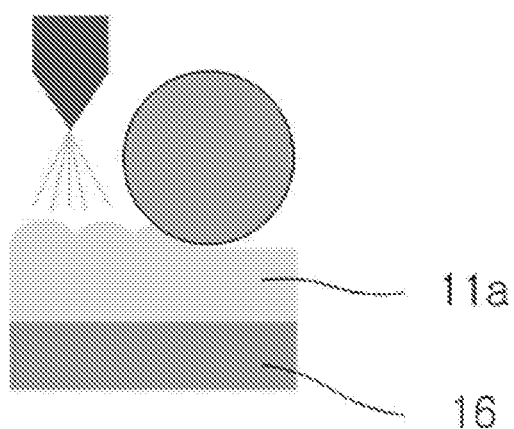
FIGS. 12 to 15 are views showing a method of manufacturing the optical filter shown in FIG. 9.

First, as shown in FIG. 12, a first light-transmitting material 11a, such as a UV-curable resin, is applied on one surface of a backing 16. As an alternative, it is possible to produce a layer from the first light-transmitting material 11a using injection molding without using the backing 16.

Figure 13:
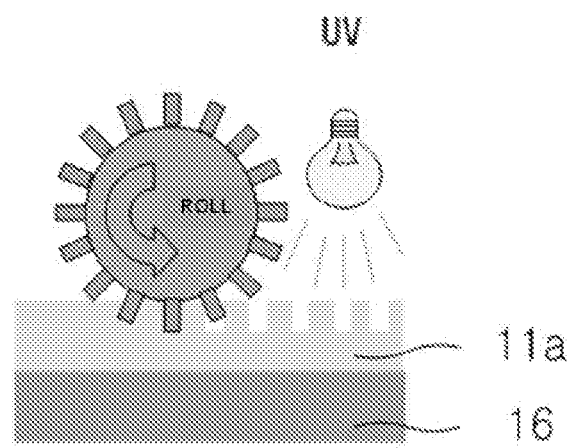

Afterwards, as shown in FIG. 13, a concave-convex pattern is formed in the UV-curable resin (i.e. the first light-transmitting material 11a) using a forming roll, and then UV rays are radiated on the UV-curable resin, thereby producing a concave-convex pattern layer. However, the present invention is not limited thereto; rather, the concave-convex pattern can be produced using various methods including, but not limited to, thermal pressing, using thermoplastic resin, and injection molding, using thermoplastic resin or thermosetting resin.

Figure 14:
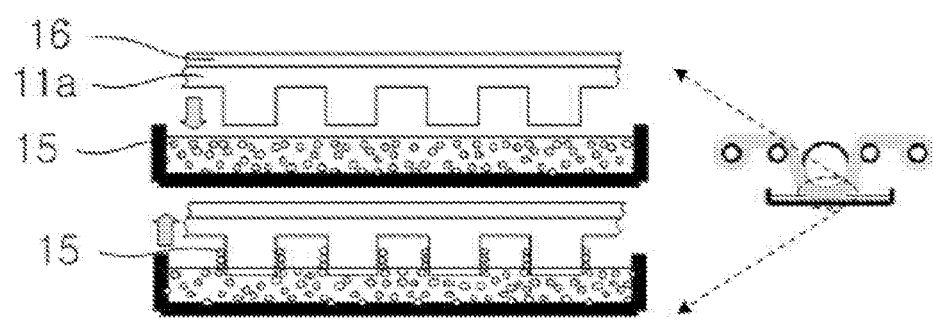

Afterwards, as shown in FIG. 14, a super-thin film made of light-diffusing particles 15 is formed on the surface of the concave-convex pattern using the self-assembly mechanism of the light-diffusing particles 15 that are dispersed in a solvent.

Figure 15:
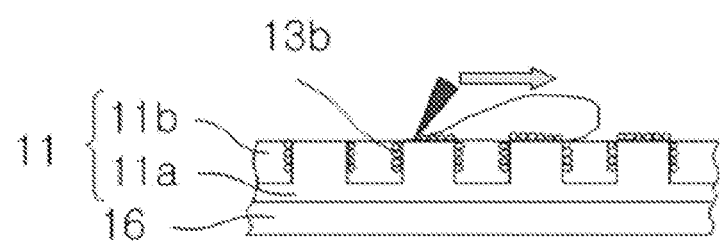

Afterwards, as shown in FIG. 15, the concave portions of the concave-convex pattern are filled with a second light-transmitting material 11b, and the coatings of the light-diffusing particles 15 and the second light-transmitting material 11b are removed from the upper surface of the pattern by being scraped with a blade.

Subsequently, the second light-transmitting material 11b is cured by radiating UV rays thereon, thereby producing a background layer 11 consisting of the first light-transmitting material 11a and the second light-transmitting material 11b.

A transparent substrate or a variety of functional films, such as an anti-fog layer or an anti-reflection layer, can be additionally stacked on the optical filter for the display filter of the invention. These materials can be adhered or bonded to the optical filter using an adhesive or a bonding agent.

Although, for the sake of convenience, only the LCD has been described as an example of the display device of the invention, the display device of the invention is not limited thereto. The display device of the invention can be implemented in a variety of devices, including (but not limited thereto): large size display devices, such as a Plasma Display Panel (PDP), an Organic Light-Emitting Diode (OLED), and a Field Emission Display (FED); small mobile display devices, such as a Personal Digital Assistant (PDA), a display window of a small size game station, and a display window of a mobile phone; and flexible display devices.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An optical filter for reducing color shift in a display device, comprising:
 a background layer made of a light-transmitting material and including a plurality of grooves; and
 a light-diffusing pattern formed over the background layer to diffuse light,
 wherein the light-diffusing pattern is a thin film coating that is formed within the plurality of grooves of the background layer,
 wherein the light-diffusing pattern is a film coating in which light-diffusing particles fill the plurality of grooves of the background layer, and
 wherein the light-diffusing pattern is a self-assembled thin film in which the light-diffusing particles are self-assembled.

2. The optical filter of claim 1, wherein the light-diffusing pattern include light-diffusing particles that have a green wavelength-absorbing color, which absorbs light having a wavelength ranging from 510 nm to 560 nm.

3. The optical filter of claim 2, wherein the light-diffusing pattern further include light-diffusing particles that have a cyan wavelength-absorbing color, which absorbs light having a wavelength ranging from 480 nm to 510 nm, and light-diffusing particles that have an orange wavelength-absorbing color, which absorbs light having a wavelength ranging from 570 nm to 600 nm.

4. The optical filter of claim 1, wherein the light-diffusing particles are colloidal particles.

5. The optical filter of claim 1, wherein the light-diffusing pattern is one selected from the group consisting of a stripe pattern, a wave pattern, a matrix pattern, and a honeycomb pattern, each of which is formed on at least one of both surfaces of the background layer.

6. A method of manufacturing an optical filter for reducing color shift in a display device, comprising:
 forming a concave-convex pattern layer made of a first light-transmitting material, the concave-convex pattern layer having a concave-convex pattern; and
 forming a light-diffusing pattern as a thin film coating along a sidewall surface of a concave section of the concave-convex pattern,
 wherein forming the light-diffusing pattern comprises applying light-diffusing particles as the thin film coating along the sidewall surface of the concave section of the concave-convex pattern, and
 wherein the light-diffusing pattern is a self-assembled thin film in which the light-diffusing particles are self-assembled.

7. The method of claim 6, further comprising, after forming a light-diffusing pattern:
 filling the concave section of the concave-convex pattern with a second light-transmitting material.

8. The method of claim 7, wherein the first light-transmitting material and the second light-transmitting material are an identical material.

9. The method of claim 6, wherein forming the light-diffusing pattern comprises dipping the concave-convex pattern in a liquid containing the light-diffusing particles.

10. The method of claim 9, wherein forming the light-diffusing pattern comprises dipping the concave-convex pattern layer to a first depth in a liquid containing the light-diffusing particles, wherein the first depth is smaller than a depth of the concave section of the concave-convex pattern.

11. The method of claim 10, further comprising, after forming the light-diffusing pattern:
 removing the thin film coating of the light-diffusing particles from an upper surface of the convex section of the concave-convex pattern.

12. The method of claim 10, further comprising, after forming the light-diffusing pattern:
 filling the concave section of the concave-convex pattern with a second light-transmitting material; and
 removing the thin film coating of the light-diffusing particles from an upper surface of a convex section of the concave-convex pattern.

13. The method of claim 12, wherein the thin film coating of the light-diffusing particles is removed from the upper surface of the convex section of the concave-convex pattern by being scraped with a blade.

14. The method of claim 6, wherein a roll-to-roll process is performed, whereby forming a concave-convex pattern layer comprises forming the concave-convex pattern layer via roll imprinting, and forming a light-diffusing pattern comprises dipping the concave-convex pattern layer in a liquid containing the light-diffusing particles, the concave-convex pattern layer being output from the rolling imprinting, and allowing the concave-convex pattern layer to pass through the liquid.

15. The method of claim 6, wherein the sidewall surface of the concave section of the concave-convex pattern is a surface that is oriented in a direction normal to the concave-convex pattern layer.

16. The method of claim 6, wherein the light-diffusing pattern is one selected from the group consisting of a stripe pattern, a wave pattern, a matrix pattern, and a honeycomb pattern, each of which is formed on at least one of both surfaces of the background layer.

* * * * *